United States Patent
Seo et al.

(10) Patent No.: US 9,522,825 B2
(45) Date of Patent: Dec. 20, 2016

(54) METHOD OF CONVERTING CARBON DIOXIDE, AND METHOD OF CAPTURING AND CONVERTING CARBON DIOXIDE

(75) Inventors: Jeong-Gil Seo, Seoul (KR); Seon-Ah Jin, Pocheon-si (KR); Kyo-Sung Park, Seongnam-si (KR); Hyun Chul Lee, Hwaseong-si (KR); Sang Min Ji, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 882 days.

(21) Appl. No.: 13/307,708

(22) Filed: Nov. 30, 2011

(65) Prior Publication Data

US 2012/0138860 A1    Jun. 7, 2012

(30) Foreign Application Priority Data

Dec. 1, 2010 (KR) .................. 10-2010-0121336
Nov. 23, 2011 (KR) .................. 10-2011-0122970

(51) Int. Cl.

| | |
|---|---|
| B01D 53/62 | (2006.01) |
| B01D 53/86 | (2006.01) |
| B01D 53/96 | (2006.01) |
| C01B 31/24 | (2006.01) |
| C01B 3/24 | (2006.01) |
| C01B 3/26 | (2006.01) |
| C01B 3/34 | (2006.01) |
| C01B 3/38 | (2006.01) |

(Continued)

(52) U.S. Cl.
CPC .............. *C01B 31/24* (2013.01); *C01B 3/34* (2013.01); *C01B 31/18* (2013.01); *C01F 5/24* (2013.01); *C01F 11/18* (2013.01); *Y02P 30/30* (2015.11)

(58) Field of Classification Search
None
See application file for complete search history.

(56) References Cited

U.S. PATENT DOCUMENTS

| | | |
|---|---|---|
| 2002/0016375 A1 | 2/2002 | Iijima et al. |
| 2004/0093796 A1 | 5/2004 | Iijima et al. |

(Continued)

FOREIGN PATENT DOCUMENTS

| | | |
|---|---|---|
| JP | 2001-342003 A | 12/2001 |
| JP | 2004-168553 A | 6/2004 |

(Continued)

*Primary Examiner* — Daniel Berns
(74) *Attorney, Agent, or Firm* — Harness, Dickey & Pierce, P.L.C.

(57) ABSTRACT

A method of converting $CO_2$ may include mixing a reducing material reforming agent including one selected from a reaction product of a $CO_2$ absorbing material ($C_{abs}$) and $CO_2$, a reaction product of a $CO_2$ absorbing material ($C_{abs}$), $CO_2$, and $H_2O$, and a combination thereof with a reducing material to provide a $CO_2$ converting material (also referred to herein as a $CO_2$ converted material). The $CO_2$ absorbing material ($C_{abs}$) may include one selected from a metal, a metal oxide, a metal carbonate, a metal bicarbonate, and a combination thereof.

11 Claims, 2 Drawing Sheets

(51) Int. Cl.
*C01B 3/40* (2006.01)
*B01J 27/232* (2006.01)
*B01J 23/02* (2006.01)
*B01J 23/04* (2006.01)
*C01F 5/24* (2006.01)
*C01F 11/18* (2006.01)
*C01B 31/18* (2006.01)

(56) References Cited

U.S. PATENT DOCUMENTS

2007/0037998 A1  2/2007  Kobayashi et al.
2009/0263316 A1* 10/2009 Iyer et al. ............... 423/658.3

FOREIGN PATENT DOCUMENTS

| JP | 2004-315475 A | 11/2004 |
| JP | 2009-120897 A | 6/2009 |

* cited by examiner

METHOD OF CONVERTING CARBON DIOXIDE, AND METHOD OF CAPTURING AND CONVERTING CARBON DIOXIDE

CROSS-REFERENCE TO RELATED APPLICATIONS

This application claims priority under 35 U.S.C. 119 to Korean Patent Application No. 10-2010-0121336, filed in the Korean Intellectual Property Office on Dec. 1, 2010, and Korean Patent Application No. 10-2011-0122970, filed in the Korean Intellectual Property Office on Nov. 23, 2011, the entire contents of each of which are incorporated herein by reference.

BACKGROUND

1. Field

This disclosure relates to a method of converting carbon dioxide, and a method of capturing and converting carbon dioxide.

2. Description of the Related Art

A flue gas may include carbon dioxide. When the carbon dioxide is discharged into the atmosphere, the carbon dioxide may cause or contribute to a greenhouse effect or the like.

Accordingly, research has been conducted on the capture of carbon dioxide so as to provide a synthesis gas with less detrimental effects to the environment.

SUMMARY

Various embodiments relate to a method of converting $CO_2$ and/or a method of capturing and converting $CO_2$ in a relatively simple and economical way.

According to a non-limiting embodiment, a method of converting $CO_2$ may include mixing a reducing material reforming agent (also referred to herein as a reforming agent) including one selected from a reaction product of a $CO_2$ absorbing material ($C_{abs}$) and $CO_2$, a reaction product of a $CO_2$ absorbing material ($C_{abs}$), $CO_2$, and $H_2O$, and a combination thereof with a reducing material to provide a $CO_2$ converting material (also referred to herein as a $CO_2$ converted material).

The $CO_2$ absorbing material ($C_{abs}$) may include one selected from a metal, a metal oxide, a metal carbonate, a metal bicarbonate, and a combination thereof.

The metal may include one selected from an alkali metal, an alkaline-earth metal, a rare earth element, a transition element, and a combination thereof.

For example, the $CO_2$ absorbing material ($C_{abs}$) may include one selected from Sr, Mn, Mg, Li, Zn, K, Ca, Ag, Cs, Na, Fe, Ba, Cu, oxides thereof, carbonates thereof, bicarbonates thereof, and a combination thereof.

The reducing material may include one selected from hydrogen, a substituted or unsubstituted C1 to C30 aliphatic hydrocarbon, a substituted or unsubstituted C3 to C30 alicyclic hydrocarbon, a substituted or unsubstituted C6 to C30 aromatic hydrocarbon, a substituted or unsubstituted C1 to C30 alcohol, ammonia, and a combination thereof.

The method of converting $CO_2$ may further include adding a catalyst to provide a $CO_2$ converting material. The catalyst may include one selected from Fe, Co, Cu, Ni, Ru, Pt, Ir, Pd, Al, Ga, Mn, Si, Zr, and a combination thereof.

The $CO_2$ absorbing material ($C_{abs}$) may further include a catalyst, and the catalyst may be the same as described above.

The $CO_2$ converting material obtained from the $CO_2$ conversion method may include one selected from the group consisting of: a synthesis gas including hydrogen and carbon monoxide; a chemical fuel including one selected from a substituted or unsubstituted C1 to C30 alcohol, a substituted or unsubstituted C2 to C30 ether, a substituted or unsubstituted C1 to C30 aliphatic hydrocarbon, a substituted or unsubstituted C3 to C30 alicyclic hydrocarbon, a substituted or unsubstituted C6 to C30 aromatic hydrocarbon, a substituted or unsubstituted C1 to C30 organic acid, urea, derivatives thereof, and a combination thereof; and a combination thereof.

For example, the $CO_2$ converting material may include one selected from the group consisting of: a synthesis gas including hydrogen and carbon monoxide; a chemical fuel including one selected from methane, methanol, dimethylether (DME), diesel, formic acid, acetic acid, formaldehyde, an olefin, a paraffin, dimethylcarbonate (DMC), urea, and a combination thereof; and a combination thereof.

According to another non-limiting embodiment, a device may be configured to perform the $CO_2$ conversion method.

According to another non-limiting embodiment, a method of capturing and converting $CO_2$ may include preparing a $CO_2$ absorbing material ($C_{abs}$), mixing the $CO_2$ absorbing material ($C_{abs}$) with a flue gas including $CO_2$ to provide a reducing material reforming agent including one selected from a reaction product of a $CO_2$ absorbing material ($C_{abs}$) and $CO_2$, a reaction product of a $CO_2$ absorbing material ($C_{abs}$), $CO_2$, and $H_2O$, and a combination thereof, and mixing the reducing material reforming agent with a reducing material to provide a $CO_2$ converting material.

The $CO_2$ absorbing material ($C_{abs}$) may include one selected from a metal, a metal oxide, a metal carbonate, a metal bicarbonate, and a combination thereof.

In the method of capturing and converting $CO_2$, the step of mixing the $CO_2$ absorbing material ($C_{abs}$) with the $CO_2$-included flue gas to provide a reducing material reforming agent including one selected from a reaction product of a $CO_2$ absorbing material ($C_{abs}$) and $CO_2$, a reaction product of a $CO_2$ absorbing material ($C_{abs}$), $CO_2$, and $H_2O$, and a combination thereof and the step of mixing the reducing material reforming agent with a reducing material to provide a $CO_2$ converting material may be simultaneously performed. The $CO_2$ absorbing material ($C_{abs}$) regenerated during the step of providing the $CO_2$ converting material may be recycled for use in forming an additional reducing material reforming agent including one selected from a reaction product of the $CO_2$ absorbing material ($C_{abs}$) and $CO_2$, a reaction product of a $CO_2$ absorbing material ($C_{abs}$), $CO_2$, and $H_2O$, and a combination thereof. The additional reducing material reforming agent may then be recycled for use in providing an additional $CO_2$ converting material.

The metal, the $CO_2$ absorbing material ($C_{abs}$), the reducing material, and the $CO_2$ converting material may be the same as described above.

The $CO_2$ absorbing material ($C_{abs}$) may further include a catalyst, and the catalyst may be the same as described above.

The $CO_2$ absorbing material ($C_{abs}$) may be mixed at about 1 mole or more per about 1 mole of $CO_2$ included in the flue gas.

The method of capturing and converting $CO_2$ may further include adding a catalyst while providing the $CO_2$ converting material. The catalyst may be the same as described above.

According to another non-limiting embodiment, a device may be configured to perform the method of capturing and converting $CO_2$.

DETAILED DESCRIPTION

Figure 1:
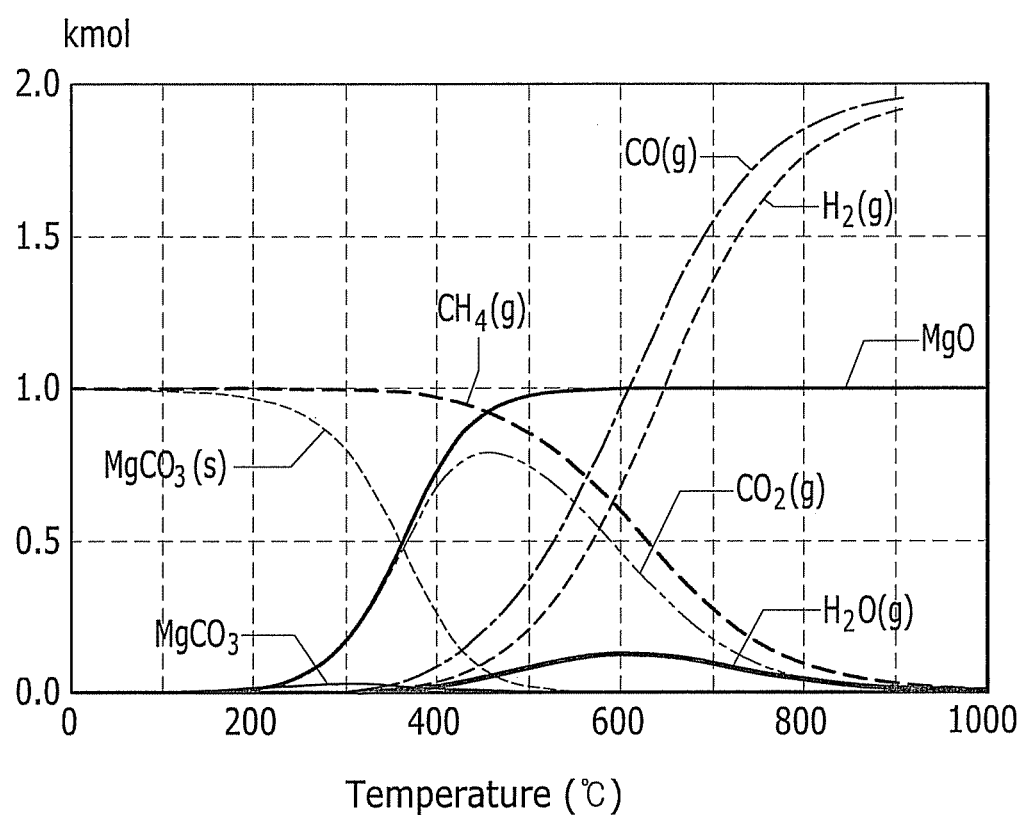
FIG. 1 is a graph showing a material distribution according to temperature when $CO_2$ is captured and converted using MgO as a $CO_2$ absorbing material ($C_{abs}$) and $CH_4$ as a reducing material.

The present disclosure will be described more fully hereinafter in the following detailed description, in which various non-limiting embodiments have been described. It should be understood that this disclosure may be embodied in many different forms and should not be construed as limited to the embodiments set forth herein.

As used herein, when a definition is not otherwise provided, the term "substituted" refers to one substituted with a substituent selected from the group consisting of a halogen (—F, —Cl, —Br, or —I), a hydroxy group, a nitro group, a cyano group, an amino group ($NH_2$, $NH(R^{100})$ or $N(R^{102})$ ($R^{102}$), wherein $R^{100}$, $R^{101}$, and $R^{102}$ are each independently a C1 to C10 alkyl group), an amidino group, a hydrazine group, a hydrazone group, a carboxyl group, a substituted or unsubstituted alkyl group, a substituted or unsubstituted haloalkyl group, a substituted or unsubstituted alkoxy group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocycloalkyl group, instead of at least one hydrogen of a functional group.

As used herein, when a definition is not otherwise provided, the term "aliphatic hydrocarbon" may refer to a C1 to C30 alkane, a C2 to C30 alkene, or a C2 to C30 alkyne, specifically a C1 to C15 alkane, a C2 to C15 alkene, or a C2 to C15 alkyne, the term "alicyclic hydrocarbon" may refer to a C3 to C30 cycloalkane, a C3 to C30 cycloalkene, or a C3 to C30 cycloalkyne, specifically a C3 to C15 cycloalkane, a C3 to C15 cycloalkene, or a C3 to C15 cycloalkyne, and the term "aromatic hydrocarbon" may refer to a C6 to C30 aromatic hydrocarbon, specifically a C6 to C20 aromatic hydrocarbon.

According to a non-limiting embodiment, a method of converting $CO_2$ may include mixing a reducing material reforming agent (also referred to as a reforming agent) including one selected from a reaction product of a $CO_2$ absorbing material ($C_{abs}$) and $CO_2$, a reaction product of a $CO_2$ absorbing material ($C_{abs}$), $CO_2$, and $H_2O$, and a combination thereof with a reducing material to provide a $CO_2$ converting material. The $CO_2$ absorbing material ($C_{abs}$), which is a material capable of capturing $CO_2$, may include one selected from a metal, a metal oxide, a metal carbonate, a metal bicarbonate, and a combination thereof.

The metal may include one selected from an alkali metal, an alkaline-earth metal, a rare earth element, a transition element, and a combination thereof. For example, the alkali metal may include one selected from Li, Na, K, Rb, Cs, Fr, and a combination thereof. The alkaline-earth metal may include one selected from Be, Mg, Ca, Sr, Ba, Ra, and a combination thereof. The rare earth element may include one selected from Sc, Y, La, Ce, Pr, Nd, Pm, Sm, Eu, Gd, Tb, Dy, Ho, Er, Tm, Yb, Lu, and a combination thereof. The transition element may include one selected from Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg, Ac, and a combination thereof.

The $CO_2$ absorbing material ($C_{abs}$) may include one selected from Sr, Mn, Mg, Li, Zn, K, Ca, Ag, Cs, Na, Fe, Ba, Cu, oxides thereof, carbonates thereof, bicarbonates thereof, and a combination thereof, but is not limited thereto.

For example, the $CO_2$ absorbing material ($C_{abs}$) may include one selected from Fe, Ag, Cu, CaO, MgO, ZnO, $K_2CO_3$, NaO, $Na_2O$, LiO, FeO, BaO, SrO, MnO, $Mn_2O_3$, $Mn_3O_4$, CuO, $Ag_2O$, AgO, and a combination thereof, but is not limited thereto.

The $CO_2$ absorbing material ($C_{abs}$) may further include a catalyst. For example, the catalyst may be included by doping the $CO_2$ absorbing material ($C_{abs}$), by substituting one or more atoms in a crystal lattice of the $CO_2$ absorbing material ($C_{abs}$), or by disposing the catalyst so as to be supported on the surface of the $CO_2$ absorbing material ($C_{abs}$), but is not limited thereto.

The catalyst may accelerate decomposition of the reducing material to form a $CO_2$ converting material (also referred to as a $CO_2$ converted material). For example, the catalyst may include one selected from Fe, Co, Cu, Ni, Ru, Pt, Ir, Pd, Al, Ga, Mn, Si, Zr and a combination thereof, but is not limited thereto.

The reducing material reforming agent includes one selected from a reaction product of a $CO_2$ absorbing material ($C_{abs}$) and $CO_2$, a reaction product of a $CO_2$ absorbing material ($C_{abs}$), $CO_2$, and $H_2O$, and a combination thereof. The reforming agent may be used for modifying a reducing material to provide a $CO_2$ converting material.

The reducing material reforming agent may include one selected from a carbonate, a bicarbonate, and a combination thereof, but is not limited thereto. For example, the carbonate may include one selected from $MgCO_3$, $Mg(CO_3)_2$, $CaCO_3$, $KCO_3$, $K_2CO_3$, $NaCO_3$, $Na_2CO_3$, $LiCO_3$, $Li_2CO_3$, $FeCO_3$, $CuCO_3$, $Ag_2CO_3$, $BaCO_3$, $SrCO_3$, $MnCO_3$, $Mn(CO_3)_2$, and a combination thereof, but is not limited thereto. The bicarbonate may include one selected from $KHCO_3$, $NaHCO_3$, and a combination thereof, but is not limited thereto.

When the $CO_2$ absorbing material ($C_{abs}$) may include a catalyst, the reducing material reforming agent may also include a catalyst. For example, the catalyst may be included by doping the reducing material reforming agent, by substituting one or more atoms in a crystal lattice of the reducing material reforming agent, or by disposing the catalyst so as to be supported on the surface of the reducing material reforming agent, but is not limited thereto.

A reducing material for forming the $CO_2$ converting material may include one selected from hydrogen ($H_2$), a substituted or unsubstituted C1 to C30 aliphatic hydrocarbon (e.g., such as methane), a substituted or unsubstituted C3 to C30 alicyclic hydrocarbon, a substituted or unsubstituted C6 to C30 aromatic hydrocarbon, a substituted or unsubstituted C1 to C30 alcohol (e.g., such as methanol), ammonia, and a combination thereof, but is not limited thereto. The kind and the amount of the reducing material may be adjusted depending upon the kind of $CO_2$ converting material to be obtained.

While providing a $CO_2$ converting material, a catalyst may be further added, and the catalyst may be the same as described above.

When a catalyst is added in the step of providing a $CO_2$ converting material, the reducing material reforming agent may include the catalyst. Thereby, a $CO_2$ converting material may be effectively formed by reacting the reducing material reforming agent including the catalyst with a reducing material. For example, the catalyst may be included by doping the reducing material reforming agent, by substituting one or more atoms in a crystal lattice of the reducing material reforming agent, or by disposing the catalyst so as to be supported on the surface of the reducing material reforming agent, but is not limited thereto. However, the step of providing a $CO_2$ converting material is not limited to the procedures described above. The catalyst added in providing a $CO_2$ converting material may be omitted in the reducing material reforming agent and may take part in providing a $CO_2$ converting material.

A $CO_2$ converting material that is obtained from the $CO_2$ conversion method may include one selected from the group consisting of: a synthesis gas including hydrogen and carbon monoxide; a chemical fuel including one selected from a substituted or unsubstituted C1 to C30 alcohol, a substituted or unsubstituted C2 to C30 ether, a substituted or unsubstituted C1 to C30 aliphatic hydrocarbon, a substituted or unsubstituted C3 to C30 alicyclic hydrocarbon, a substituted or unsubstituted C6 to C30 aromatic hydrocarbon, a substituted or unsubstituted C1 to C30 organic acid, urea, derivatives thereof, and a combination thereof; and a combination thereof, but is not limited thereto.

For example, the $CO_2$ converting material may include one selected from the group consisting of: a synthesis gas including hydrogen and carbon monoxide; a chemical fuel including one selected from a substituted or unsubstituted C1 to C15 alcohol, a substituted or unsubstituted C2 to C15 ether, a substituted or unsubstituted C1 to C15 aliphatic hydrocarbon, a substituted or unsubstituted C3 to C15 alicyclic hydrocarbon, a substituted or unsubstituted C6 to C20 aromatic hydrocarbon, a substituted or unsubstituted C1 to C15 organic acid, urea, derivatives thereof, and a combination thereof; and a combination thereof, but is not limited thereto.

In a further example, the $CO_2$ converting material may include one selected from the group consisting of: a synthesis gas including hydrogen and carbon monoxide; a chemical fuel including one selected from methane, methanol, dimethylether (DME), diesel, formic acid, acetic acid, formaldehyde, an olefin, a paraffin, dimethylcarbonate (DMC), urea, and a combination thereof; and a combination thereof, but is not limited thereto.

According to another non-limiting embodiment, a device for performing the $CO_2$ conversion method is provided, and the device may be fabricated in various ways. For example, the device may include a $CO_2$ converter, a plant, a power generator, or the like, but is not limited thereto.

The method of capturing and converting $CO_2$ according to another non-limiting embodiment may include preparing a $CO_2$ absorbing material ($C_{abs}$), mixing the $CO_2$ absorbing material ($C_{abs}$) with a flue gas including $CO_2$ to provide a reducing material reforming agent including one selected from a reaction product of a $CO_2$ absorbing material ($C_{abs}$) and $CO_2$, a reaction product of a $CO_2$ absorbing material ($C_{abs}$), $CO_2$, and $H_2O$, and a combination thereof, and mixing the reducing material reforming agent with a reducing material to provide a $CO_2$ converting material. The $CO_2$ absorbing material ($C_{abs}$), which is a material capable of capturing $CO_2$, may include one selected from a metal, a metal oxide, a metal carbonate, a metal bicarbonate, and a combination thereof.

The $CO_2$ absorbing material ($C_{abs}$), the metal, the reducing material reforming agent, the reducing material, and the $CO_2$ converting material may be the same as described above.

According to the method of capturing and converting $CO_2$, the flue gas may be directly mixed with the reducing material after capturing the $CO_2$ and without separating the $CO_2$ to provide a $CO_2$ converting material. After capturing the $CO_2$, the $CO_2$-removed flue gas is discharged to the outside of a reactor. Thereby, the $CO_2$ capture and the $CO_2$ conversion may be simultaneously performed, which may improve efficiency and save costs.

In addition, in the $CO_2$ capture and conversion method, $CO_2$ may become a $CO_2$ converting material (also referred to as a $CO_2$ converted material) from the reducing material reforming agent while providing a $CO_2$ converting material, and the $CO_2$ absorbing material ($C_{abs}$) may be regenerated. The regenerated $CO_2$ absorbing material ($C_{abs}$) may be mixed with the flue gas including $CO_2$ to be recycled for providing a reducing material reforming agent. In other words, the $CO_2$ absorbing material ($C_{abs}$) regenerated from the step of providing a $CO_2$ converting material may be recycled for providing a reducing material reforming agent, and the reducing material reforming agent may be recycled for providing a $CO_2$ converting material. According to the $CO_2$ capture and conversion method, additional $CO_2$ absorbing material ($C_{abs}$) may not be needed because of the regeneration, and the step of mixing the $CO_2$ absorbing material ($C_{abs}$) with the flue gas including $CO_2$ to provide a reducing material reforming agent may be simultaneously performed with the step of mixing the reducing material reforming agent with a reducing material to provide a $CO_2$ converting material, which may simplify the process and effectively improve the economics.

However, without being limited thereto, the $CO_2$ capture and conversion method may be further include supplying a $CO_2$ absorbing material ($C_{abs}$), if required.

The $CO_2$ absorbing material ($C_{abs}$) may further include a catalyst. For example, the catalyst may be included by doping the $CO_2$ absorbing material ($C_{abs}$), by substituting one or more atoms in a crystal lattice of the $CO_2$ absorbing material ($C_{abs}$), or by disposing the catalyst so as to be supported on the surface of the $CO_2$ absorbing material ($C_{abs}$), but is not limited thereto.

The catalyst and when the $CO_2$ absorbing material ($C_{abs}$) may further include a catalyst may be the same as described above.

In the $CO_2$ capture and conversion method, the $CO_2$ absorbing material ($C_{abs}$) may be added at about 1 mole or more per about 1 mole of $CO_2$ included in the flue gas. When the $CO_2$ absorbing material ($C_{abs}$) is mixed within this range, it may effectively capture the $CO_2$ included in the flue gas.

While providing a $CO_2$ converting material, a catalyst may be further added. The catalyst and when a catalyst is further added in the step of providing a $CO_2$ converting material may be the same as described above.

According to another non-limiting embodiment, a device for performing the $CO_2$ capture and conversion method is provided, and the device may be manufactured in various forms. For example, the device may include a $CO_2$ capturer and converter, a plant, a power generator, or the like, but is not limited thereto. Hereinafter, the $CO_2$ capture and conversion method according to various embodiments is described with reference to the following examples. However, the $CO_2$ capture and conversion method according to the various example embodiments is not limited thereto.

As an example, MgO may be used as the $CO_2$ absorbing material ($C_{abs}$), and $CH_4$ may be used as the reducing material. In this case, the MgO is mixed with the flue gas including $CO_2$ to perform a reaction according to the following Reaction Scheme 1 to provide a reducing material reforming agent of $MgCO_3$. Thereby, $CO_2$ may be captured according to the following Reaction Scheme 1.

[Reaction Scheme 1]

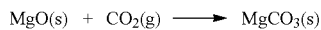

$$MgO(s) + CO_2(g) \longrightarrow MgCO_3(s)$$

The provided $MgCO_3$ is mixed with a reducing material of $CH_4$ and reacted according to the following Reaction Scheme 2 to provide a synthesis gas including hydrogen and carbon monoxide. Thus, the $CO_2$ converted material may include regenerated $MgO(s)$ and the synthesis gas ($CO(g)$ and $H_2(g)$).

[Reaction Scheme 2]

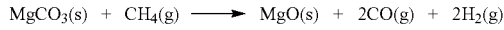

$$MgCO_3(s) + CH_4(g) \longrightarrow MgO(s) + 2CO(g) + 2H_2(g)$$

The regenerated $MgO(s)$ may be recycled for use as a starting material in Reaction Scheme 1.

FIG. 1 is a graph showing a material distribution according to temperature which confirms that the reaction is performed according to Reaction Scheme 2. As shown in FIG. 1, when about 1 mole of $MgCO_3(s)$ is reacted with about 1 mole of $CH_4(g)$, the reaction provides about 1 mole of $MgO(s)$, about 2 moles of $CO(g)$, and about 2 moles of $H_2(g)$.

As another example, CaO may be used as a $CO_2$ absorbing material ($C_{abs}$), and $CH_4$ may be used as a reducing material. In this case, the CaO is mixed with flue gas including $CO_2$ and reacted according to the following Reaction Scheme 3 to provide a reducing material reforming agent of $CaCO_3$. Thereby, $CO_2$ may be captured according to the following Reaction Scheme 3.

[Reaction Scheme 3]

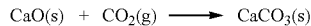

$$CaO(s) + CO_2(g) \longrightarrow CaCO_3(s)$$

The provided $CaCO_3$ is mixed with a reducing material of $CH_4$ and reacted according to the following Reaction Scheme 4 to provide a synthesis gas including hydrogen and carbon monoxide. Thus, the $CO_2$ converted material may include regenerated $CaO(s)$ and the synthesis gas ($CO(g)$ and $H_2(g)$).

[Reaction Scheme 4]

$$CaCO_3(s) + CH_4(g) \longrightarrow CaO(s) + 2CO(g) + 2H_2(g)$$

The regenerated $CaO(s)$ may be recycled for use as a starting material in Reaction Scheme 3.

Figure 2:
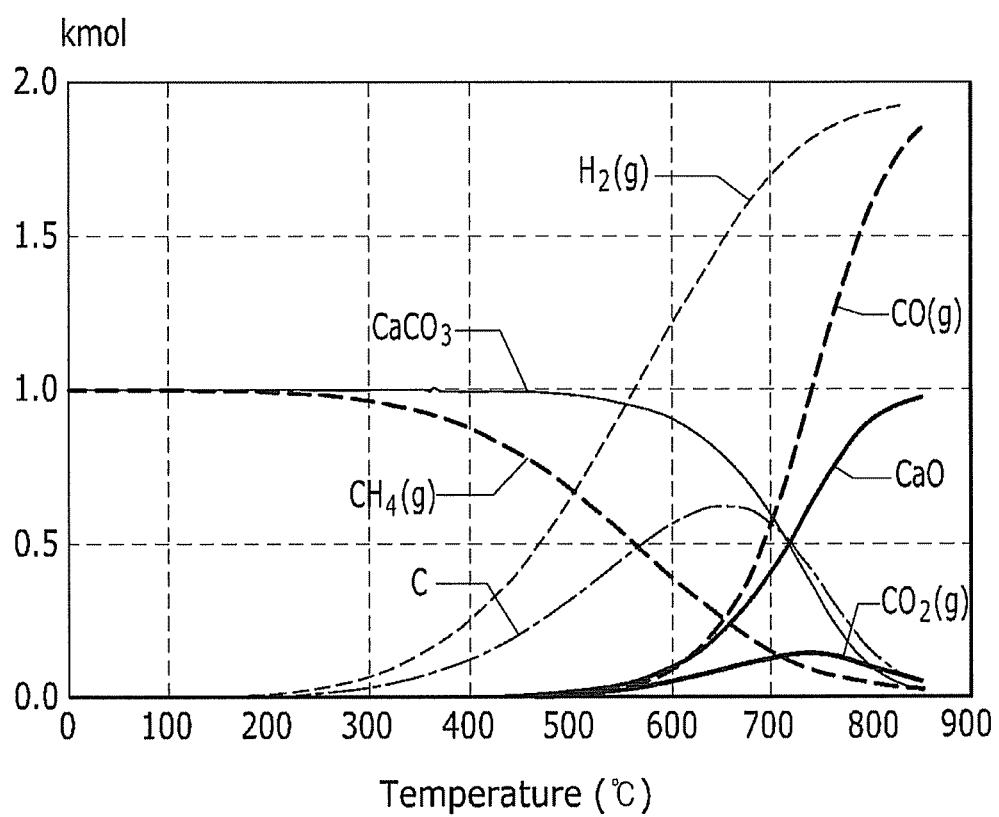
FIG. 2 is a graph showing a material distribution according to temperature when $CO_2$ is captured and converted using CaO as a $CO_2$ absorbing material ($C_{abs}$) and $CH_4$ as a reducing material.

FIG. 2 is a graph showing a material distribution according to temperature which confirms that the reaction is performed according to Reaction Scheme 4. As shown in FIG. 2, when about 1 mole of $CaCO_3$ (s) is reacted with about 1 mole of $CH_4$ (g), the reaction provides about 1 mole of $CaO(s)$, about 2 moles of $CO(g)$, and about 2 moles of $H_2(g)$.

As another example, $K_2CO_3$ may be used as a $CO_2$ absorbing material ($C_{abs}$), and $CH_4$ may be used as a reducing material. In this case, the $K_2CO_3$ is mixed with flue gas including $CO_2$ and reacted according to the following Reaction Scheme 5 to provide a reducing material reforming agent of $KHCO_3$. Thereby, $CO_2$ may be captured according to the following Reaction Scheme 5.

[Reaction Scheme 5]

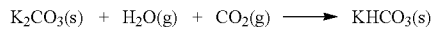

$$K_2CO_3(s) + H_2O(g) + CO_2(g) \longrightarrow KHCO_3(s)$$

The provided $KHCO_3$ is mixed with a reducing material of $CH_4$ and reacted according to the following Reaction Scheme 6 to provide a synthesis gas including hydrogen and carbon monoxide. Thus, the $CO_2$ converted material may include regenerated $K_2CO_3(s)$ and the synthesis gas ($CO(g)$ and $H_2(g)$).

[Reaction Scheme 6]

$$2KHCO_3(s) + 2CH_4(g) \longrightarrow K_2CO_3(s) + 3CO(g) + 5H_2(g)$$

The regenerated $K_2CO_3(s)$ may be recycled for us as a starting material in Reaction Scheme 5.

From the examples, it is confirmed that the method of capturing and converting $CO_2$ may be simplified and economically improved in an effective way since the additional $CO_2$ absorbing material ($C_{abs}$) is not added, and the step of mixing the $CO_2$ absorbing material ($C_{abs}$) with the flue gas including $CO_2$ to provide a reducing material reforming agent is simultaneously performed with the step of mixing the reducing material reforming agent with a reducing material to provide a $CO_2$ converting material (also referred to herein as a $CO_2$ converted material).

EXAMPLES

Hereinafter, this disclosure is discussed in more detail with reference to the following examples. However, it should be understood that these are merely example embodiments and should not be construed as limiting.

Example 1

Performance of $CO_2$ Capturing Reaction and Converting Reaction (using Ru—MgO)

A $CO_2$ capturing reaction using Ru—MgO which is an Ru-included $CO_2$ absorbing material, and subsequently a $CO_2$ converting reaction using Ru—$MgCO_3$ which is a reducing material reforming agent obtained from the $CO_2$ capturing reaction are performed in series. For such continuous reactions, an ½ inch-straight type quartz reactor is equipped in an electric furnace, and a reactant is allowed to continuously pass through the Ru-included $CO_2$ absorbing material Ru—MgO or the reducing material reforming agent Ru—$MgCO_3$ layer in the reactor while maintaining a constant reaction temperature using a temperature controller. The amounts of carbon dioxide, methane, and nitrogen used in the reactions are controlled by using a mass flow controller.

Specifically, the quartz reactor is filled with 0.5 g of Ru—MgO prior to the $CO_2$ capturing reaction, and then the quartz reactor is heated up to 200° C. under a nitrogen atmosphere to remove impurities from the surface of Ru—MgO and to activate Ru—MgO. For the $CO_2$ capturing reaction, a reaction temperature is fixed at 200° C. while maintaining a molar ratio of $CO_2:N_2$ to be 0.4:0.6, and adjusting a space velocity at 24,000 ml/h·g. As a result, referring to the following Table 1, $CO_2$ 15.0 parts by weight based on 100 parts by weight of the filled Ru—MgO is captured to provide a reducing material reforming agent Ru—$MgCO_3$.

For the $CO_2$ converting reaction to occur in series subsequent to the $CO_2$ capturing reaction, the reactor completed with the $CO_2$ capturing reaction is heated up to 500° C., and then a reducing material of $CH_4$ diluted with nitrogen is injected into the reactor. For the $CO_2$ converting reaction, a reaction temperature is fixed at 500° C. while maintaining a molar ratio of $CH_4:N_2$ to be 0.5:0.5, and adjusting a space velocity at 24,000 ml/h·g. As a result, referring to the following Table 1, a conversion rate of $CH_4$ is 13.8%. From the synthesis of a $CO_2$ converting material including hydrogen and carbon monoxide in the form of gas, as well as the re-conversion of a reducing material reforming agent Ru—$MgCO_3$ into a $CO_2$ absorbing material Ru—MgO, it is confirmed that a $CO_2$ capturing reaction and a $CO_2$ converting reaction occur in series.

Example 2

Performance of $CO_2$ Capturing Reaction and Converting Reaction (using Ru—CaO)

A $CO_2$ capturing reaction using an Ru-included $CO_2$ absorbing material Ru—CaO, and a $CO_2$ converting reaction using a reducing material reforming agent of Ru—$CaCO_3$ obtained from the $CO_2$ capturing reaction are performed in series. The $CO_2$ capturing reaction and $CO_2$ converting reaction were performed according to the same method as discussed in Example 1 except the temperature of the $CO_2$ capturing reaction was maintained at 500° C. and the temperature of the $CO_2$ converting reaction was maintained at 800° C.

As a result, referring to the following Table 1, $CO_2$ 44.2 parts by weight based on 100 parts by weight of the filled Ru—CaO is captured to provide a reducing material reforming agent Ru—$CaCO_3$. Also, as a result of the $CO_2$ converting reaction, referring to the following Table 1, a conversion rate of $CH_4$ is 85.4%. From the synthesis of a $CO_2$ converting material including hydrogen and carbon monoxide in the form of gas, as well as the re-conversion of a reducing material reforming agent Ru—$CaCO_3$ into a $CO_2$ absorbing material Ru—CaO, it is confirmed that a $CO_2$ capturing reaction and a $CO_2$ converting reaction occur in series.

Referring to Table 1, it is confirmed that a $CO_2$ capturing reaction and a $CO_2$ converting reaction may be continuously performed, and improved efficiencies of $CO_2$ capturing and CO2 converting may be achieved according to Examples 1 and 2.

While this disclosure has been described in connection with various embodiments, it is to be understood that the invention is not limited to the disclosed embodiments. On the contrary, the disclosure is intended to cover various modifications and equivalent arrangements included within the spirit and scope of the appended claims.

What is claimed is:

1. A method of capturing and converting $CO_2$, the method comprising:
    first mixing a $CO_2$ absorbing material ($C_{abs}$) with a flue gas to form a reforming agent, the flue gas including $CO_2$, the reforming agent comprising at least one of a reaction product of the $CO_2$ absorbing material ($C_{abs}$) and $CO_2$, and a reaction product of the $CO_2$ absorbing material ($C_{abs}$), $CO_2$, and $H_2O$, the $CO_2$ absorbing material ($C_{abs}$) including at least one of a metal, a metal oxide, a metal carbonate, and a metal bicarbonate; and
    second mixing the reforming agent with a reducing material to form a $CO_2$ converted material,
    wherein the first mixing and the second mixing are simultaneously performed, and the $CO_2$ converted material includes a regenerated $CO_2$ absorbing material ($C_{abs}$) that is recycled so as to mix with the flue gas to form an additional reforming agent, and the additional reforming agent is recycled to form an additional $CO_2$ converted material.

2. The method of claim 1, wherein the first mixing includes ensuring that the metal comprises at least one of an alkali metal, an alkaline-earth metal, a rare earth element, and a transition element.

3. The method of claim 1, wherein the first mixing includes ensuring that the $CO_2$ absorbing material ($C_{abs}$) comprises at least one of Sr, Mn, Mg, Li, Zn, K, Ca, Ag, Cs, Na, Fe, Ba, Cu, oxides thereof, carbonates thereof, and bicarbonates thereof.

4. The method of claim 1, wherein the first mixing includes ensuring that the $CO_2$ absorbing material ($C_{abs}$) comprises a catalyst.

5. The method of claim 4, wherein the first mixing includes ensuring that the catalyst comprises at least one of Fe, Co, Cu, Ni, Ru, Pt, Ir, Pd, Al, Ga, Mn, Si, and Zr.

6. The method of claim 1, wherein first mixing includes mixing about 1 mole or more of the $CO_2$ absorbing material ($C_{abs}$) with about 1 mole of the $CO_2$ in the flue gas.

7. The method of claim 1, wherein the second mixing includes ensuring that the reducing material comprises at least one of hydrogen, a substituted or unsubstituted C1 to C30 aliphatic hydrocarbon, a substituted or unsubstituted C3 to C30 alicyclic hydrocarbon, a substituted or unsubstituted

TABLE 1

| | A temperature of $CO_2$ capturing reaction (° C.) | An amount of $CO_2$ captured (parts by weight based on 100 parts by weight of the $CO_2$ absorbing material) | A temperature of $CO_2$ converting reaction (° C.) | A conversion rate of $CH_4$ (%) |
|---|---|---|---|---|
| Example 1 (Ru—MgO) | 200 | 15.0 | 500 | 13.8 |
| Example 2 (Ru—CaO) | 500 | 44.2 | 800 | 85.4 |

C6 to C30 aromatic hydrocarbon, a substituted or unsubstituted C1 to C30 alcohol, and ammonia.

8. The method of claim 1, further comprising:
adding a catalyst to form the $CO_2$ converted material.

9. The method of claim 8, wherein the adding includes ensuring that the catalyst comprises at least one of Fe, Co, Cu, Ni, Ru, Pt, Ir, Pd, Al, Ga, Mn, Si, and Zr.

10. The method of claim 1, wherein the second mixing includes ensuring that the $CO_2$ converted material comprises at least one of a synthesis gas comprising hydrogen and carbon monoxide; and a chemical fuel comprising at least one of a substituted or unsubstituted C1 to C30 alcohol, a substituted or unsubstituted C2 to C30 ether, a substituted or unsubstituted C1 to C30 aliphatic hydrocarbon, a substituted or unsubstituted C3 to C30 alicyclic hydrocarbon, a substituted or unsubstituted C6 to C30 aromatic hydrocarbon, a substituted or unsubstituted C1 to C30 organic acid, urea, and derivatives thereof.

11. The method of claim 10, wherein the second mixing includes ensuring that the $CO_2$ converted material comprises at least one of a synthesis gas comprising hydrogen and carbon monoxide; and a chemical fuel comprising at least one of methane, methanol, dimethylether (DME), diesel, formic acid, acetic acid, formaldehyde, an olefin, a paraffin, dimethylcarbonate (DMC), and urea.

* * * * *